United States Patent
Kadono et al.

(10) Patent No.: US 8,262,492 B2
(45) Date of Patent: Sep. 11, 2012

(54) SPACER NUT MANUFACTURING METHOD

(75) Inventors: Yasuyuki Kadono, Tokyo (JP); Yuji Kadono, Tokyo (JP)

(73) Assignee: Watoku Co., Ltd., Tokyo (JP)

( * ) Notice: Subject to any disclaimer, the term of this patent is extended or adjusted under 35 U.S.C. 154(b) by 190 days.

(21) Appl. No.: 12/673,456

(22) PCT Filed: Dec. 25, 2009

(86) PCT No.: PCT/JP2009/007300
§ 371 (c)(1),
(2), (4) Date: May 25, 2010

(87) PCT Pub. No.: WO2010/125624
PCT Pub. Date: Nov. 4, 2010

(65) Prior Publication Data
US 2011/0111869 A1    May 12, 2011

(30) Foreign Application Priority Data

Apr. 30, 2009   (JP) ................................. 2009-110382

(51) Int. Cl.
  B21D 53/24   (2006.01)
  B21H 3/08    (2006.01)
  B21K 1/64    (2006.01)
(52) U.S. Cl. ............................... 470/18; 470/20; 470/25
(58) Field of Classification Search ................... 470/18, 470/20, 25; 411/427, 432, 436
See application file for complete search history.

(56) References Cited

U.S. PATENT DOCUMENTS 2,026,859 A * 1/1936 Baynes ......................... 411/427
3,141,182 A * 7/1964 Lanius, Jr. ....................... 470/2

* cited by examiner

*Primary Examiner* — Bena Miller
(74) *Attorney, Agent, or Firm* — Smith Patent Office

(57) ABSTRACT

A spacer nut manufacturing method which does not use a NC lathe and which allows machining using existing press working equipment, involves a low parts supply cost, and which helps to achieve a high production efficiency at a low production cost is disclosed. The method of manufacturing a spacer nut arranged between a casing and a board arranged inside the casing and serving to fix the board in position while keeping the board spaced apart from the casing by a predetermined distance dimension is presented.

5 Claims, 2 Drawing Sheets

SPACER NUT MANUFACTURING METHOD

TECHNICAL FIELD

The present invention relates to a method of manufacturing a spacer nut which is arranged between a casing and a board of a computer or the like in order to fix the casing and the board in position while keeping them spaced apart from each other by a predetermined distance dimension when mounting the board in the casing.

BACKGROUND ART

When fixing a board in position within the casing of a personal computer or the like, it is necessary for the board to be spaced apart from the inner side surface of the casing by a predetermined dimension in order to prevent confinement of heat, a shock from the outside, etc. Thus, as shown in FIG. 2, a spacer nut 12 formed in a substantially cylindrical configuration is forced into an inner side surface 11 of a casing 10 and fixed in position so as to be erect, and a screw passing hole portion 14 previously provided in a board 13 and the spacer nut 12 are matched with each other; then, the board 13 is placed on the spacer nut 12, and the board 13 and the spacer nut 12 are fixed to each other by a screw 15, whereby the board 13 and the inner side surface 11 of the casing 10 are spaced apart from each other by a dimension corresponding to the height of the spacer nut 12.

As shown in FIG. 3, generally speaking, the spacer nut 12 includes a shaft portion 16 of a substantially cylindrical overall configuration, and a flange portion 17 arranged at a proximal end portion of the shaft portion 16, with a gear-like serration portion 18 being formed in the outer periphery of the flange portion 17.

Further, a circumferentially extending groove portion 19 is formed in the outer periphery of the proximal end portion of the shaft portion 16, and a thread groove 22 that can be threadedly engaged with the screw 15 (not shown in FIG. 3) is formed in an inner peripheral surface portion 21. Due to the provision of the serration portion 18 and the groove portion 19, the material of the casing 10 enters trough portions 20 of the serration portion 18 and the groove 19 as shown in FIG. 2 when the spacer nut 12 is forced into the casing 10, thereby enabling the spacer nut 12 to be firmly fixed to the casing 10.

The spacer nut of the above configuration has been generally produced by using an NC lathe by the following procedures:

(1) A serration portion is formed by knurling in the entire area of the outer peripheral surface portion of a cylindrical bar material formed in a diameter somewhat larger than that of the spacer nut to be produced.

(2) The bar material is cut in a predetermined length dimension as appropriate according to the kind of spacer nut to be produced.

(3) After the cutting, the material is rotated circumferentially around the axis of the cylinder, and the portion of the serration portion other than that constituting the flange portion is cut off to form the shaft portion, and, at the same time, the groove portion is formed by cutting at the proximal end portion of the shaft portion.

Since the above cutting operations are performed by using an NC lathe, it is possible to secure a high machining precision.

However, an NC lathe is generally rather expensive, and has a problem in that it involves a very large introduction cost when it is newly introduced as equipment.

Further, since the material is a cylindrical bar material, it cannot be formed into a roll shape as in the case of a metal plate material. Thus, due to restrictions in terms of handling, there is used a material previously cut in a length dimension of approximately 1 to 2 meters.

Thus, in the machining operation, it is necessary to newly replenish a bar material as appropriate, resulting in a rather poor production efficiency; further, since it is necessary to previously machine the material into a cylindrical shape, the material supply cost involved is rather high.

Despite the above-mentioned problems, there has been proposed until now no effective manufacturing method to take the place of the manufacturing method using an NC lathe.

DISCLOSURE OF THE INVENTION

Technical Problem

It is an object of the present invention to provide a spacer nut manufacturing method which uses no NC lathe, which allows machining using existing press working equipment, which involves a low parts supply cost, and which helps to achieve a high production efficiency at a low production cost.

Technical Solution

To achieve the above object, there is provided a method of manufacturing a spacer nut arranged between a casing and a board arranged inside the casing and serving to fix the board in position while keeping the board spaced apart from the casing by a predetermined distance dimension. The method includes: a first step of forming a protrusion of a predetermined length on a metal plate material of a predetermined thickness dimension by press working; a second step of forging the protrusion into a shaft portion in the form of a bottomed cylinder and forming a flange portion at a peripheral edge of a proximal end portion of the shaft portion by press working; a third step of forming an opening at a distal end portion of the shaft portion by press working; a fourth step of performing pressing radially inwards on the proximal end portion of the shaft portion to form a groove portion extending circumferentially around the shaft portion; a fifth step of stamping the flange portion from the metal plate material while forming a serration portion along an outer periphery of the flange portion by press working; and a sixth step of forming a thread groove portion in an inner peripheral surface portion of the shaft portion.

Thus, the formation of the shaft portion constituting the spacer nut, the formation of the flange portion, the formation of the opening, the formation of the groove portion, and the formation of the serration portion of the flange portion can all be performed by using existing press working equipment.

Further, the metal plate material serving as the material is previously formed into a roll shape, whereby it is possible to set a large amount of material in an apparatus, so that the frequency of replacement of the material is low, thus making it possible to produce a large amount of products collectively.

The second step includes a drawing step of reducing the diameter dimension of the protrusion, and a crushing step of crushing a distal end portion of the protrusion to form a distal end surface portion.

Thus, due to the above second step, it is possible to simultaneously perform the adjustment of the diameter dimension and the formation of the distal end surface portion.

The second step includes a step of forming, at the distal end surface portion of the shaft portion shaped, a tapered truncated-cone-shaped recess whose inner peripheral surface portion is gradually reduced in diameter toward the proximal end portion of the shaft portion.

When performing the machining to form the thread groove in the above sixth step, if the thread groove is formed, with the distal end surface portion remaining flat and smooth, the opening is expanded at the time of formation of the thread groove, and the end edge portion of the opening is swollen toward the distal end portion of the shaft portion, making it impossible to maintain the distal end surface portion of the finished product in a flat and smooth state.

By previously forming the truncated-cone-shaped recess prior to the third step of forming the opening, the end edge portion of the opening formed in the third step is formed in a tapered configuration gradually reduced in diameter toward the proximal end portion of the shaft portion.

Thus, even if, at the time of formation of the thread groove, the end edge portion of the opening is swollen in the direction of the distal end portion of the shaft portion, there is no possibility of the end edge portion of the opening protruding from the distal end surface portion.

Provided between the second step and the third step is a crushing step of removing a rounded portion formed between the proximal end portion of the shaft portion and the metal plate material. Thus, the depth of the groove portion formed in the fourth step is uniform.

The press working in the first through fifth steps is conducted through die frame shaping.

Advantageous Effect

The formation of the shaft portion, the formation of the flange portion, the formation of the opening, the formation of the groove portion, and the formation of the serration portion of the flange portion can all be performed by press working using a metal plate as the material, so that there is no need to introduce an NC lathe, making it possible to produce a spacer nut by using existing press working equipment.

Further, when compared with the conventional method, the material is a metal plate material, so that there is no need for previous processing cost, making it possible to achieve a reduction in material supply cost.

Further, since the metal plate material can be formed into a roll shape, it is possible to reduce the number of times that the material is replenished, so that it is possible to produce a large amount of products at one time, thus providing a spacer nut manufacturing method of high production efficiency and low production cost.

Further, in the second step, and at the distal end surface portion of the protrusion, a tapered truncated-cone-shaped recess whose inner peripheral surface portion is gradually reduced in diameter toward the proximal end portion of the shaft portion, so that even when the thread groove is formed in the sixth step, the distal end surface portion is formed in a flat and smooth state, thereby providing high quality in terms of appearance and making it possible to provide a spacer nut which is little subject to generation of inclination, wobbling, etc. when the board is placed.

Further, in the spacer nut manufacturing method, there is provided between the second step and the third step a crushing step of removing the rounded portion formed between the proximal end portion of the shaft portion and the metal plate material, so that the depth of the groove portion formed is uniform, and the casing material is easily allowed to enter the groove at the time of forcing the spacer nut into the casing, thus making it possible to provide a spacer nut that can be fixed in position more firmly.

Further, the press working of the first through fifth steps is conducted through die frame shaping, so that, in addition to the effect of the invention, it is possible to make the configuration of the products uniform, to achieve an improvement in terms of product quality, and to achieve a further improvement in terms of production efficiency.

Figure 1:
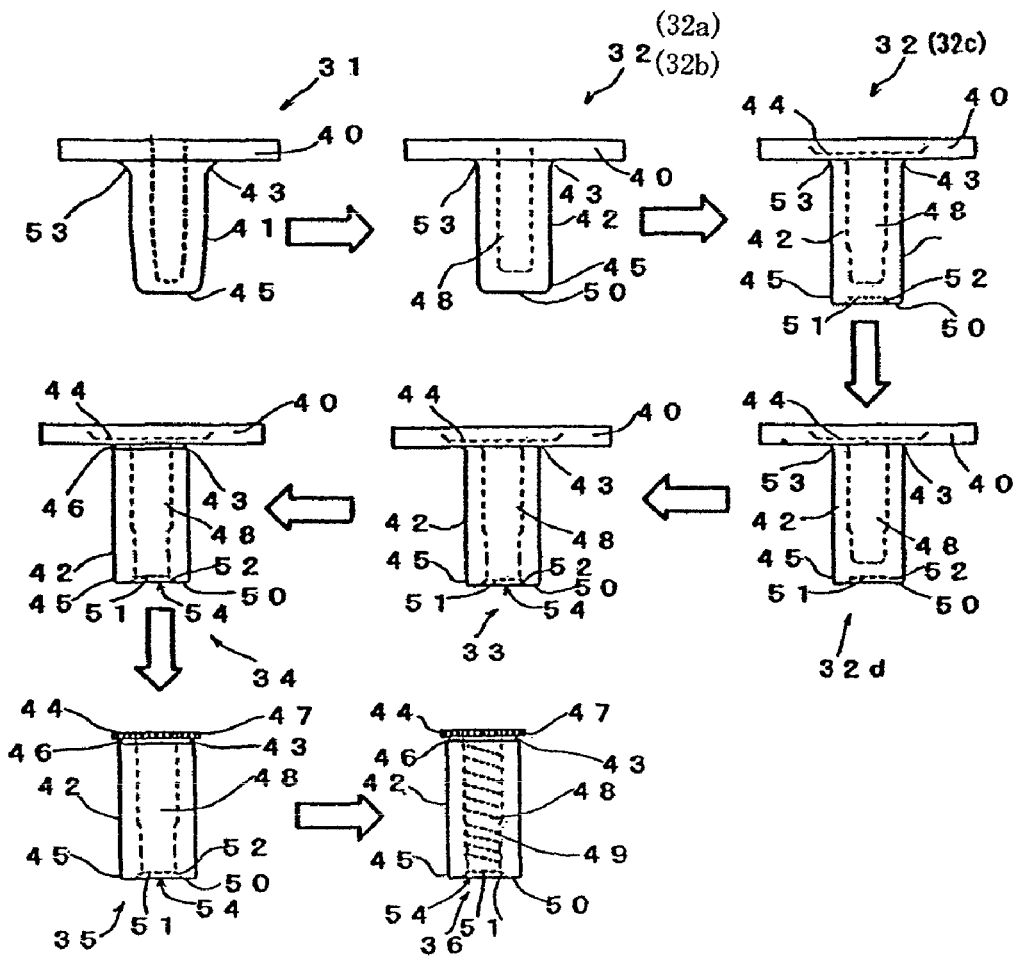
FIG. 1 is a conceptual drawing illustrating a series of steps of a spacer nut manufacturing method according to an embodiment of the present invention.
Figure 2:
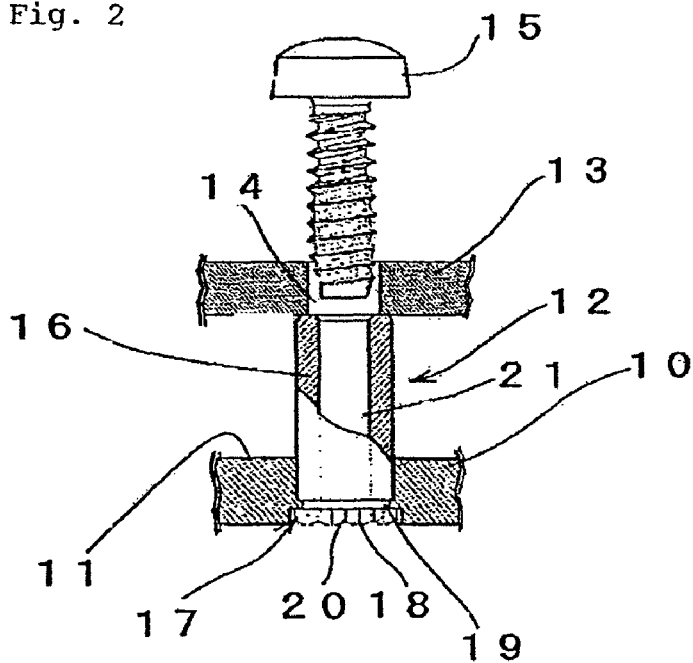
FIG. 2 is a side view illustrating how an ordinary spacer nut is mounted to a casing to fix a board in position.
Figure 3:
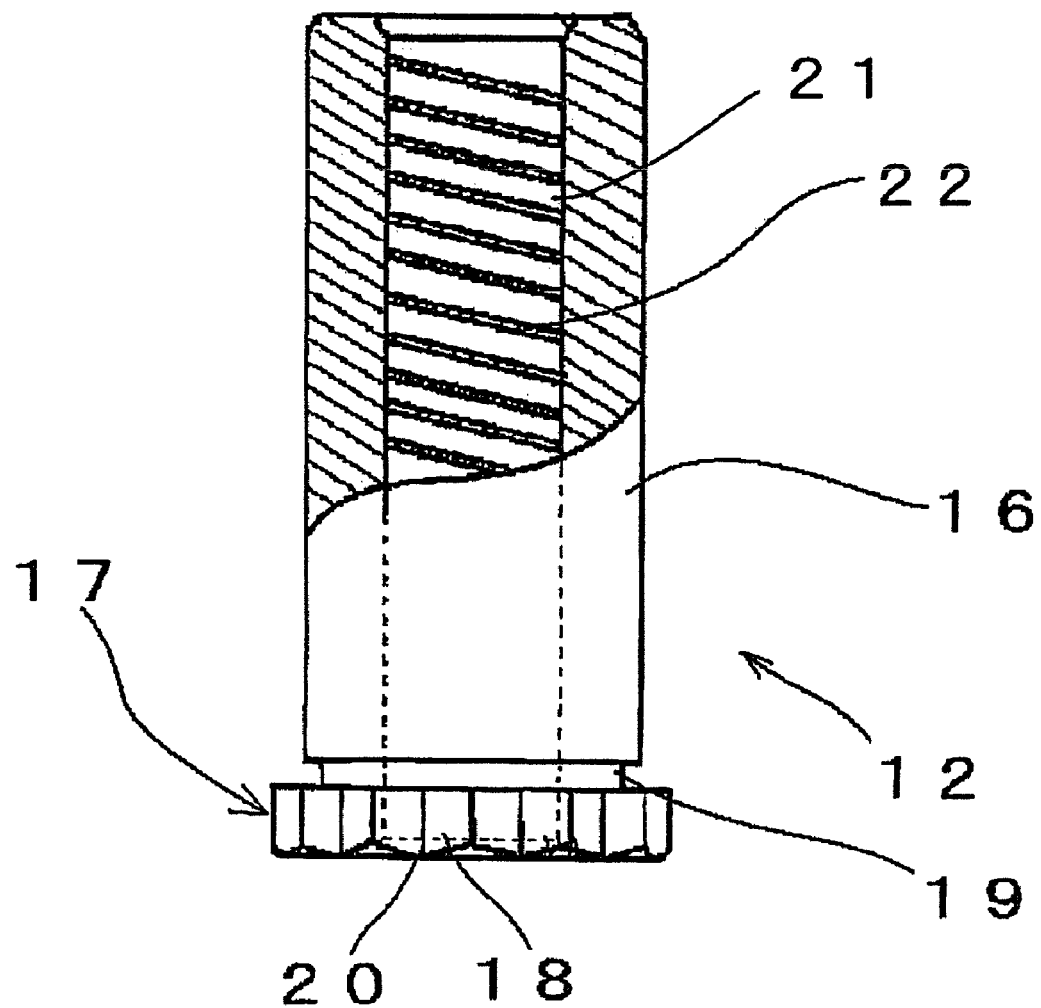
FIG. 3 is a partial side sectional view showing the configuration of an ordinary spacer nut.

EXPLANATION OF REFERENCE 10 casing
11 casing inner side surface
12 spacer nut
13 board
14 hole in the board
15 screw
16 spacer nut shaft portion
17 spacer nut flange portion
18 serration portion
19 groove portion
20 trough portion of the serration portion
21 inner peripheral surface portion of the shaft portion
22 thread groove
30 spacer nut manufacturing method
31 first step
32 second step
32a radial drawing step
32b distal end portion crushing step
32c truncated-cone-shaped recess forming step
32d rounded portion crushing step
33 third step
34 fourth step
35 fifth step
36 sixth step
40 metal plate material
41 protrusion
42 shaft portion
43 proximal end portion of the shaft portion (protrusion)
44 flange portion
45 distal end portion
46 groove portion
47 serration portion
48 inner peripheral surface portion of the shaft portion
49 thread groove
50 distal end surface portion of the shaft portion
51 truncated-cone-shaped recess
52 inner peripheral surface portion of the truncated-cone-shaped recess (the inner peripheral surface portion in the vicinity of the opening)
53 rounded portion
54 opening

BEST MODE FOR CARRYING OUT THE INVENTION

A mode for carrying out the present invention will be described with reference to the drawings.

As shown in FIG. 1, a spacer nut manufacturing method 30 according to the present invention comprises: a first step 31 of forming a protrusion 41 of a predetermined length by press working on a metal plate material 40 having a predetermined thickness dimension; a second step 32 of forging the protrusion 41 into a shaft portion 42 in the form of a bottomed cylinder and forming a flange portion 44 at the peripheral edge of a proximal end portion 43 of the shaft portion 42 by press working; a third step 33 of forming an opening 54 at a distal end portion 45 of the shaft portion 42 by press working; a fourth step 34 of pressing the proximal end portion 43 of the shaft portion 42 radially inwards to form a groove portion 46 extending in the circumferential direction of the shaft portion 42 by press working; a fifth step 35 of stamping the flange portion 44 from the metal plate material 40 by press working while forming a serration portion 47 by press working along the outer periphery of the flange portion 44; and a sixth step 36 of forming a thread groove 49 in an inner peripheral surface portion 48 of the shaft portion 42.

The second step 32 includes a drawing step 32a of reducing the diameter dimension of the protrusion 41, and a crushing step 32b of crushing the distal end portion of the protrusion 41 to form a distal end surface portion 50.

The second step 32 includes a step 32c of forming, at the distal end surface portion 50 of the shaped shaft portion 42, a tapered truncated-cone-shaped recess 51 whose inner peripheral surface portion 52 is gradually reduced in diameter toward the proximal end portion 43 of the shaft portion 42.

Further, there is provided, between the second step 32 and the third step 33, a crushing step 32d of removing a rounded portion 53 formed between the proximal end portion 43 of the shaft portion 42 and the metal plate material 40. The press working in each of the steps 31, 32, 32a, 32b, 32c, 32d, 33, 34, and 35 is effected by forcing the portion to be machined into a die frame (not shown in FIG. 1) previously formed in the configuration to be obtained through the machining.

MODE FOR THE INVENTION

In the following, this embodiment will be described in detail with reference to the drawings.

FIG. 1 is a conceptual drawing illustrating a series of steps of the spacer nut manufacturing method 30 of this embodiment.

As shown in FIG. 1, in the first step 31, the metal plate material 40 is forced into a die frame (not shown in the drawing) to form the protrusion 41.

The thickness dimension of the die frame can be changed as appropriate in accordance with the height dimension, the outside dimension, or the inner diameter dimension of the spacer nut to be produced.

In the steps 32a and 32b of the second step 32, the protrusion 41 is successively forced into die frames corresponding to the respective steps, and the diameter dimension of the protrusion 41 is reduced, and, at the same time, the distal end portion 45 is crushed to form the distal end surface portion 50, thus forming the cylindrical shaft portion 42.

Subsequently, by being forced into a die frame corresponding to the step 32c, the distal end surface portion 50 of the shaft portion 42 is pressed in the height direction by the die frame, and there is formed, at the distal end surface portion 50, the tapered truncated-cone-shaped recess 51 whose inner peripheral surface portion 52 is gradually reduced in diameter toward the proximal end portion 43 of the shaft portion 42; and, at the same time, the proximal end portion 43 of the shaft portion 42 of the metal plate material 40 is crushed by press working to thereby form the flange portion 44.

The protrusion 41 is formed by forcing a part of the metal plate material 40 into the die frame, so that, when causing the protrusion 41 to protrude from the metal plate material 40, a rounded portion 53 with an arcuate side surface is formed between the proximal end portion 43 of the protrusion 41 and the metal plate material 40.

If the rounded portion 53 is allowed to remain, it is impossible to form, in the fourth step 34 described below, a groove portion 46 of a fixed depth at the proximal end portion 43 of the shaft portion 42. Thus, in the step 32d after the second step 32, the shaft portion 43 is forced into a die frame formed in a configuration corresponding to the step 32d, whereby the rounded portion 53 is crushed, and the shaft portion 42 and the metal plate material 40 are shaped so as to be orthogonal to each other.

Next, in the third step 33, the shaft portion 43 is forced into a die frame in which a protrusion (not shown) for stamping an opening is provided, whereby an opening 54 is formed in the distal end surface portion 50 of the shaft portion 42.

In the distal end surface portion 50, the truncated-cone-shaped recess 51 has been previously formed in the step 32, so that the end edge portion 52 of the opening 54 formed is of a tapered configuration gradually reduced in diameter toward the proximal end portion 43.

Further, forcing of the material into a die frame corresponding to the fourth step 34 is effected, whereby the groove portion 46 extending in the circumferential direction is formed in the outer peripheral surface portion of the proximal end portion 43 of the shaft portion 42.

After this, in the fifth step 35, the shaft portion 42 and the flange portion 44 are forced into a die frame with a serration formed on an inner peripheral portion thereof, and stamping is effected by press working, whereby the flange portion 44 having a serration portion 47 is stamped from the metal plate material 40.

Further, in the sixth step 36, a thread groove 49 is cut in an inner peripheral surface portion 48 of the shaft portion 42 by using a tap, whereby the product is completed.

In the third step 33 of the above embodiment, the end edge portion 52 of the opening 54 is formed in a tapered configuration gradually reduced in diameter toward the proximal end portion 43 of the shaft portion 42, so that, when forming the thread groove 49 in the sixth step 36, even if the end edge portion 53 of the opening 54 is expanded radially outwards by a tap, and swollen in the direction of the distal end portion of the shaft portion 42, the end edge portion 53 of the opening does not protrude from the distal end surface portion 50, and the distal end surface portion 50 is maintained in a flat and smooth state. Thus, it is possible to manufacture a spacer nut which, when a plurality of such spacer nuts are mounted to a casing or the like, the height of each spacer nut is fixed, and which helps to prevent wobbling of the board when the board or the like is placed, thus further facilitating the operation of fixing the board in position.

All of the first step 31 through the fifth step 35 are conducted by press working using a die frame, and the sixth step 36 can be conducted by using an existing tap device, so that there is no need for a great change in the conventional equipment; thus, the requisite capital investment may be very small.

Further, the metal material constituting the material requires no special previous processing, so that it is also possible to achieve a reduction in material supply cost.

Thus, there is no need for a new capital investment such as purchasing of an NC lathe, and it is possible to achieve a reduction in material supply cost, making it possible to achieve a substantial reduction in production cost as compared with the conventional spacer nut manufacturing method.

Further, due to the preparation of a die frame, the configuration of the resultant products is uniform, and it is possible to achieve an improvement in terms of product quality and to achieve a further improvement in turns of production efficiency.

While in this embodiment the formation of the thread groove 49 in the sixth step 36 is separately effected by using a tap, it is also possible to form the thread groove 49 by forcing the shaft portion into a die frame for thread hole formation and performing press working thereon.

Further, to correct distortion or the like generated in the shaft portion 43 and the distal end surface portion 50 after the formation of the opening 54 in the third step 33, it is also possible to separately provide a drawing step. When a press working involving great deformation is to be performed in each of the first step 31 through the fifth step 35, each of the above steps may be divided into a plurality of sub steps in order to prevent distortion or deformation, effecting formation into the target shape in each of the steps 31 through 35 stepwise by using corresponding die frames.

Further, also in the case of a bottomed spacer nut having no opening at the distal end portion, it is possible to manufacture it through press working as in this embodiment by omitting the third step 33 of this embodiment.

Industrial Applicability

The present invention is applicable to a method of manufacturing a spacer nut which is arranged between a casing and a board of a computer or the like when mounting the board in the casing in order to fix the board in position while keeping it spaced apart from the casing by a predetermined distance dimension.

The invention claimed is:

1. A method of manufacturing a spacer nut arranged between a casing and a board arranged inside the casing and serving to fix the board in position while keeping the board spaced apart from the casing by a predetermined distance dimension, the method comprising: a first step of forming a protrusion of a predetermined length on a metal plate material of a predetermined thickness dimension by press working; a second step of forging the protrusion into a shaft portion in the form of a bottomed cylinder and forming a flange portion at a peripheral edge of a proximal end portion of the shaft portion by press working; a third step of forming an opening at a distal end portion of the shaft portion by press working; a fourth step of performing pressing radially inwards on the proximal end portion of the shaft portion to form a groove portion extending circumferentially around the shaft portion; a fifth step of stamping the flange portion from the metal plate material while forming a serration portion along an outer periphery of the flange portion by press working; and a sixth step of forming a thread groove portion in an inner peripheral surface portion of the shaft portion.

2. A spacer nut manufacturing method according to claim 1, wherein the second step includes a drawing step of reducing the diameter dimension of the protrusion, and a crushing step of crushing a distal end portion of the protrusion to form a distal end surface portion.

3. A spacer nut manufacturing method according to claim 2, wherein the second step includes a step of forming, at the distal end surface portion of the shaft portion shaped, a tapered truncated-cone-shaped recess whose inner peripheral surface portion is gradually reduced in diameter toward the proximal end portion of the shaft portion.

4. A spacer nut manufacturing method according to claim 1, wherein there is provided between the second step and the third step a crushing step of removing a rounded portion formed between the proximal end portion of the shaft portion and the metal plate material.

5. A spacer nut manufacturing method according to claim 1, wherein the press working in the first through fifth steps is conducted through die frame shaping.

* * * * *